United States Patent
Gonnard et al.

[11] Patent Number: 5,726,519
[45] Date of Patent: Mar. 10, 1998

[54] TRAVELING-WAVE PIEZOELECTRIC MOTOR

[75] Inventors: Paul Gonnard, Villeurbanne; Lionel Petit, Lyon, both of France

[73] Assignee: Figest BV, Leiden, Netherlands

[21] Appl. No.: 770,134

[22] Filed: Dec. 19, 1996

[30] Foreign Application Priority Data

Jan. 4, 1996 [FR] France ................... 96 00061

[51] Int. Cl.⁶ ................................. H01L 41/08
[52] U.S. Cl. ................................. 310/323
[58] Field of Search ................... 310/323, 328

[56] References Cited

U.S. PATENT DOCUMENTS

| | | | |
|---|---|---|---|
| 5,363,006 | 11/1994 | Yano et al. | 310/323 |
| 5,585,685 | 12/1996 | Maeno et al. | 310/323 |

FOREIGN PATENT DOCUMENTS

| | | |
|---|---|---|
| 0669662A1 | 8/1995 | European Pat. Off. |
| PCT/EP94/02732 | 2/1995 | WIPO. |

*Primary Examiner*—Mark O. Budd
*Attorney, Agent, or Firm*—Laff, Whitesel, Conte & Saret, Ltd.

[57] ABSTRACT

Traveling-wave piezoelectric motor comprising at least one stator (1), two groups of piezoelectric elements consisting of ceramic rods (5) polarized independently of one another, arranged perpendicularly to the stator and excited by an alternating current with a phase shift of $\pi/2$ between the groups so as to generate a deformation in the form of a traveling wave on the surface of the stator (1), and at least one rotor (2, 3) in the form of a disk. The stator is in the form of a wheel consisting of a peripheral annulus over which the piezoelectric elements are distributed, of a central hub and of linking arms intended to transmit an axial pressure exerted on the hub to the annulus.

It is thus possible to compress the rods with a much greater force than that applied to the rotor. This prestress has the effect of limiting the spread in the resonant frequencies.

5 Claims, 3 Drawing Sheets

Fig.1
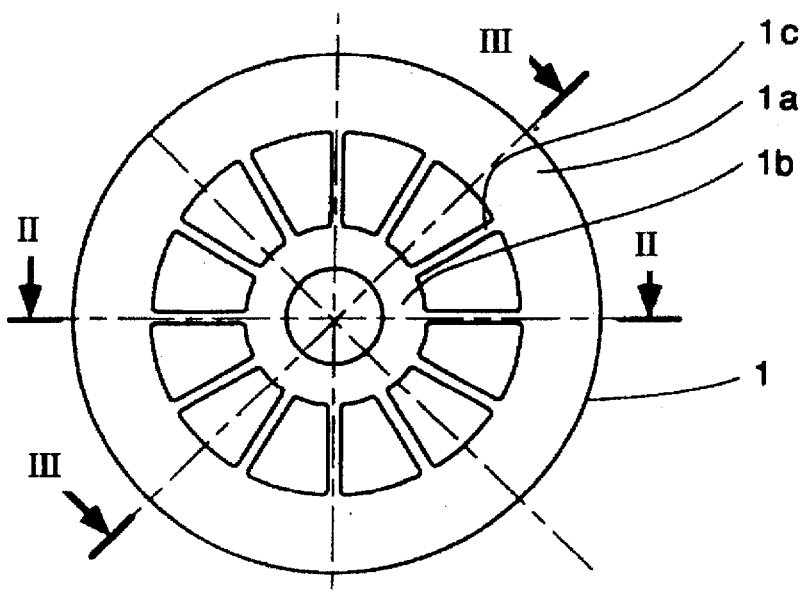

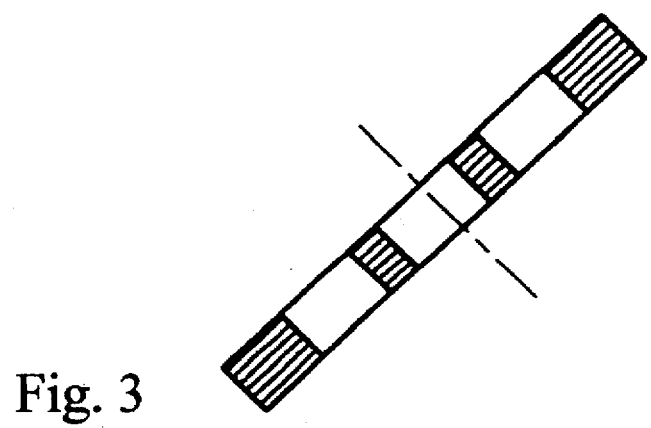
Fig. 3

TRAVELING-WAVE PIEZOELECTRIC MOTOR

FIELD OF THE INVENTION

The subject of the invention is a traveling-wave piezoelectric motor comprising at least one stator, two groups of piezoelectric elements consisting of ceramic rods polarized independently of one another, arranged perpendicularly to the stator, that is to say parallel to the axis of the motor, distributed over the stator, in permanent contact with the stator and excited by an alternating current with a phase shift of $\pi/2$ between the groups so as to generate a deformation in the form of a traveling wave on the surface of the stator, and at least one rotor in the form of a disk retained elastically in contact with the stator for the rotational driving thereof by the traveling wave generated on the stator.

PRIOR ART

Such a piezoelectric motor is known from document WO 95/05 682.

This motor comprises two rotors in the form of disks keyed onto a shaft and a double-stator drive system mounted between the rotors and comprising a first annular stator for driving one of the rotors and a second annular stator for driving the second rotor. The stators are linked together by piezoelectric rods with dual polarization, consisting of two piezoelectric rods cemented in opposition of polarity by one of their ends or by a single rod polarized in both directions with the help of a single electrode, of annular shape arranged at the middle thereof. These rods are excited by an alternating current and organized into two groups, one vibrating in phase quadrature with the other so as to produce the two standing waves required in making up a traveling wave which, transmitted to the stators, drives the rotors in rotation.

A spread in the resonant frequency of the rods of a few hertz, and due to a difference in the length of the rods, gives rise to a considerable phase spread between the waves generated. But, all the rods of a group have to vibrate in phase in order to participate in concert in setting up the traveling wave.

The known solutions to this problem are to pair up the rods, this being expensive and ill-suited to mass production, or to crop or tailor them very accurately, this also giving rise to an oncost. Furthermore, these two means are limited by the accuracy of machining.

Another solution would be to compress the rods. Thus, it has been noted that their compression makes it possible considerably to limit the spread in the resonant frequencies.

In the motor according to document WO 95/05 682, the force applied to the rods is however related directly to that applied to the rotor. But, the force which needs to be applied between rotor and stator is around ten times less than that necessary to compress the rods effectively. A compromise must therefore be made in regard to these two forces which have substantially different requirements.

Means of prestressing the piezoelectric elements are used in the piezoelectric motors described in documents FR 2 715 780 and EP 552 754 A1 with a different purpose, this purpose being that the piezoelectric elements should be used in compression only, these elements being stronger in compression than in tension.

These prestressing means cannot however be applied in a simple manner to the motor of document WO 95/05 682.

SUMMARY OF THE INVENTION

Additionally, the purpose of the invention is to modify the motor according to document WO 95/05 682 in such a way that the piezoelectric rods may be compressed under a force large enough to limit the spread in the resonant frequencies, although without the rotor being made to bear too heavily against the stator.

This purpose is achieved by the piezoelectric motor according to the invention, wherein the stator is in the form of a wheel consisting of a peripheral annulus over which the piezoelectric elements are distributed, of a central hub and of linking arms distributed regularly between the peripheral annulus and the hub and intended to transmit an axial pressure exerted on the hub to the annulus and thus to the piezoelectric elements, so as to limit the spread in the resonant frequency of the piezoelectric elements, these arms furthermore allowing the circulation over the peripheral annulus of a traveling wave, the axial pressure applied by means of pressure means to the hub in order to compress the piezoelectric elements being independent of the means retaining the rotor elastically in contact against the stator.

The stator produced in this way makes it possible to compress the rods under a force which is independent of that applied to the rotor. It therefore makes it possible to compress them with a force large enough to limit the spread in the resonant frequencies.

A motor produced with the stator according to the invention possesses a quality factor, also referred to as the overvoltage factor, five times greater than that of a motor produced according to the prior art.

Moreover, the pieces of the motor, in particular the stator, are simple to produce industrially.

The stator can be simplified in the extreme, for greater ease of manufacture during industrial production, by making the holes by drilling and cutting, the jointing spokes then being formed by the material between the holes.

BRIEF DESCRIPTION OF THE DRAWINGS

The appended drawing represents an embodiment of the invention.

FIG. 1 represents a top view of the stator of the present invention.

FIG. 3 represents a transverse sectional view of the stator taken along view line III of FIG. 1.

DESCRIPTION OF THE PREFERRED EMBODIMENT

Figure 2:
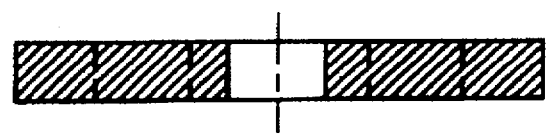
FIG. 2 represents a transverse sectional view of the stator taken along view line II of FIG. 1.
Figure 4:
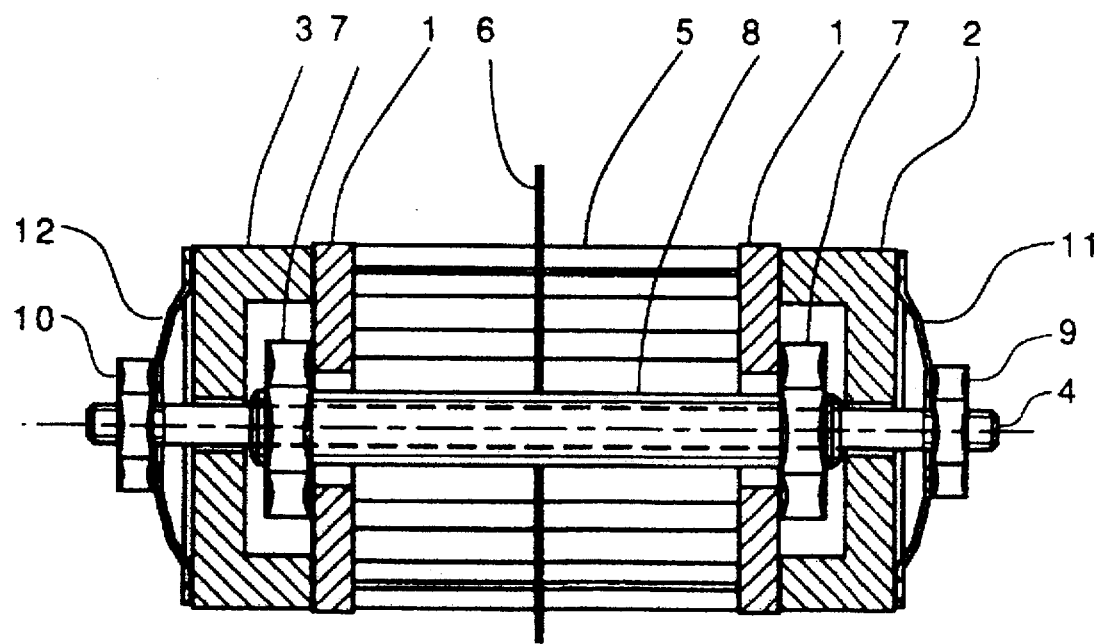
FIG. 4 represents an axial sectional view of an embodiment of the piezoelectric motor according to the invention.
Figure 5:
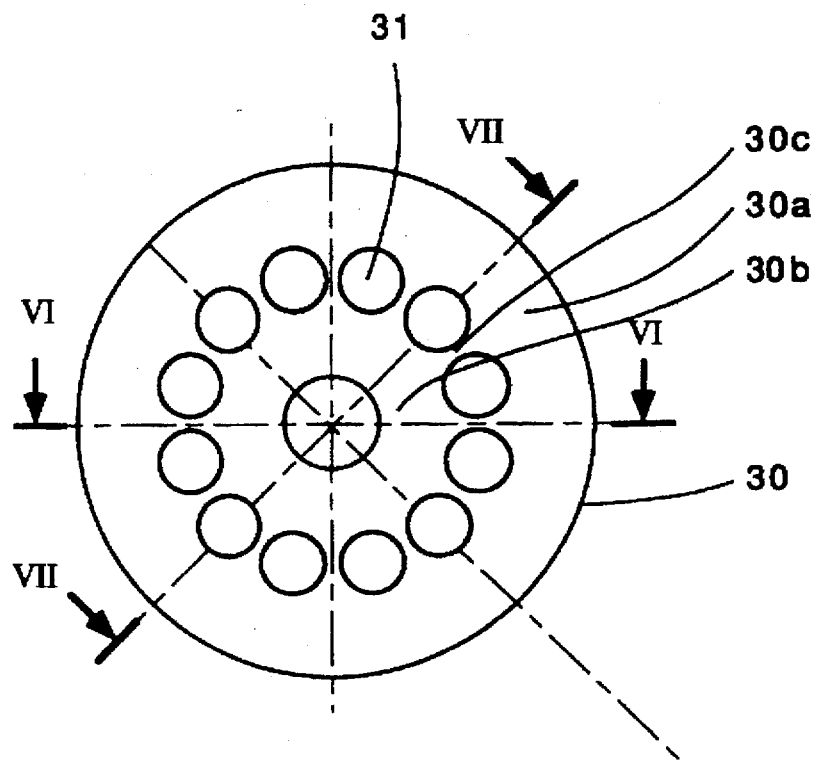
FIG. 5 represents a top view of an alternative embodiment of the stator of the present invention.
Figure 6:
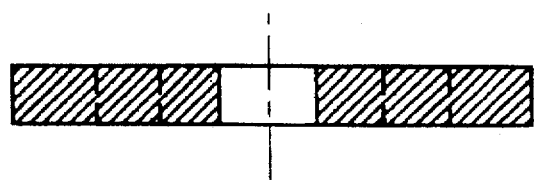
FIG. 6 represents a transverse sectional view of the alternative embodiment of the stator taken along view line VI of FIG. 5.
Figure 7:
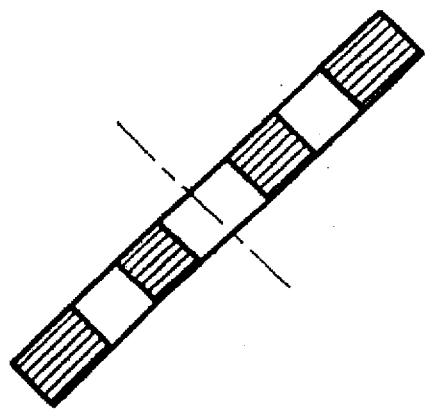
FIG. 7 represents a transverse sectional view of the alternative embodiment of the stator taken along view line VII of FIG. 5.

The stator 1 represented in FIG. 1 consists of a peripheral annulus 1a and a hub 1b which are linked together by radial arms 1c distributed uniformly over the whole of the periphery. These arms 1c have a width which is merely a fraction of their thickness. In the example represented, the width/thickness ratio is around 1/5. The stator is made in one piece.

When loaded along the axis of their largest thickness, the spokes 1c of the stator 1 can transmit a stress applied to the hub 1b to the peripheral annulus 1a. Since the spokes are entirely free to be twisted in their smallest thickness, they allow the propagation of a traveling flexional wave in the peripheral annulus and therefore do not hinder the oscillations of the contact surface formed by the annulus 1a.

The arms 1c could be formed by simple drilling. In this case, the holes separating the arms are round and only in their middle region do the arms exhibit a width which is merely a fraction of their thickness.

The motor represented in part in FIG. 2 comprises two rotors 2, 3 keyed onto a shaft 4 and a double-stator drive system mounted between the rotors 2, 3 and comprising two stators 1 such as that represented in FIG. 1, one being intended for the driving of the rotor 2 and the other for the driving of the rotor 3. The peripheral annuli of the stators 1 are linked together by two groups of six piezoelectric rods 5 with dual polarization, as in the motor according to document WO 95/05682. These rods are polarized in the two directions with the help of a single electrode 6 of annular shape arranged at the middle thereof and they are arranged parallel to the shaft 4 of the motor. The rods 5 are compressed between the stators 1 by means of nuts 7 mounted on a threaded tube 8 passing through the hubs of the stators, these nuts 7 pushing the stators 1 toward one another and therefore compressing the piezoelectric rods 5. The shaft 4 of the rotors 2, 3 passes through the threaded tube 8. The tube 8 and the shaft 4 are rotationally free with respect to one another. The rotors 2, 3 are respectively made to bear elastically against their stator 1 by means of a nut 9, 10 screwed onto the shaft 4 and bringing a spring washer 11, 12 to bear against the rotors 2, 3.

By relatively simple means, the force intended to compress the piezoelectric elements and that intended to bring the rotor to bear against the stator may thus be applied independently of one another.

According to a variant embodiment of the stator, and such as represented in FIG. 3, the radial arms 30c linking the hub 30b to the annulus 30a are formed by the material remaining between circular holes 31 formed by drilling. The arms 30c are substantially shorter than the arms 1c of FIG. 1, this having the advantageous effect of raising their resonant frequency well beyond the working frequencies.

The embodiment described in FIGS. 1, 2 and 3 does not limit the scope of the invention.

The means for applying force to the rotor and the rods may be different from those represented, the latter having been simplified as much as possible for the sake of convenience of explanation.

We claim:

1. A traveling-wave piezoelectric motor comprising at least one stator (1), two groups of piezoelectric elements consisting of ceramic rods (5) polarized independently of one another, arranged perpendicularly to the stator (1), that is to say parallel to the axis of the motor, distributed over the stator (1), in permanent contact with the stator (1) and excited by an alternating current with a phase shift of $\pi/2$ between the groups so as to generate a deformation in the form of a traveling wave on the surface of the stator (1), and at least one rotor (2, 3) in the form of a disk retained elastically in contact with the stator (1) for the rotational driving thereof by the traveling wave generated on the stator, wherein the stator (1) is in the form of a wheel consisting of a peripheral annulus (1a) over which the piezoelectric elements are distributed, of a central hub and of linking arms (1c) distributed regularly between the peripheral annulus and the hub (1b) and intended to transmit to the annulus (1a) an axial pressure exerted on the hub (1b) and thus to the piezoelectric elements (5), so as to limit the spread in the resonant frequency of the piezoelectric elements (5), these arms (1c) furthermore allowing the circulation over the peripheral annulus (1a) of a traveling wave, the axial pressure applied by means of pressure means (7) to the hub (1b) in order to compress the piezoelectric elements being independent of the means (9, 10, 11, 12) retaining the rotor (2, 3) elastically in contact against the stator (1).

2. The piezoelectric motor as claimed in claim 1, wherein the linking arms (1c) have, at least in their middle region, a width smaller than their thickness so as to be able to transmit a stress applied to the hub (1b) to the peripheral annulus (1a) and allow the propagation of a traveling wave in the peripheral annulus (1a).

3. The piezoelectric motor as claimed in claim 2, wherein said arms (30c) are formed by the material remaining between circular holes (31) distributed circularly over a disk.

4. The piezoelectric motor as claimed in claim 1, wherein a hollow tube (8) passes axially through the hub (1b), wherein the pressure means (7) allowing the application of an axial pressure to the hub (1b) in the direction of the rods (5) consist of a removable element (7) solid with this tube (8) and bearing on the hub (1b) and wherein the rotor (2, 3) is keyed onto a shaft (4) passing axially through the tube (8) and rotationally free with respect to this tube (8), the means (9, 10, 11, 12) which retain the rotor elastically against the stator (1) consisting of a removable element (9, 10) solid with the shaft (4) and bearing on an elastic element (11, 12) which transmits the pressure to the rotor (2, 3).

5. The piezoelectric motor as claimed in claim 4, wherein the removable elements (7, 9, 10) are nuts screwed respectively onto the tube (8) and onto the shaft of the rotor (4).

* * * * *